United States Patent [19]
Aguilar et al.

[11] Patent Number: 5,473,556
[45] Date of Patent: Dec. 5, 1995

[54] DIGIT REVERSE FOR MIXED RADIX FFT

[75] Inventors: Raul A. Aguilar; Jeffrey L. Miller, both of Vancouver, Wash.

[73] Assignees: Sharp Microelectronics Technology, Inc., Camas, Wash.; Sharp Kabushiki Kaisha, Osaka, Japan

[21] Appl. No.: 117,959

[22] Filed: Sep. 8, 1993

Related U.S. Application Data

[63] Continuation of Ser. No. 877,949, Apr. 30, 1992, abandoned.

[51] Int. Cl.$^6$ .................................................. G06F 15/00
[52] U.S. Cl. ........................................................ 364/726
[58] Field of Search ........................... 364/715.01, 725, 364/726, 759, 784

[56] References Cited

U.S. PATENT DOCUMENTS

| | | | |
|---|---|---|---|
| H570 | 1/1989 | Tylaska et al. | 364/726 |
| 4,181,976 | 1/1980 | Collins et al. | 364/726 |
| 4,831,570 | 5/1989 | Abiko | 364/726 |
| 5,029,079 | 7/1991 | Magar et al. | |
| 5,091,875 | 2/1992 | Wong et al. | 364/726 |

OTHER PUBLICATIONS

Coryell, "Address Generator for Fast Fourier Transform", IBM Technical Disclosure Bulletin, vol. 12, No. 10, pp. 1687–1689, 1970.
Tylaska et al., "Generation of Digit Reversed Address Sequences for Fast Fourier Transform", IEEE Transactions on Computers, vol. 40, No. 6, 1991, pp. 780–784.
Gordon L. DeMuth, Algorithms for Defining Mixed Radix FFT Flow Graphs, Sep 1989, pp. 1349–1358, IEEE Transactions on Acoustics, Speech, and Signal Processing, vol. 37, No. 9.
James S. Walker, A New Bit Reversal Algorithm, Aug. 1990, pp. 1472–1473, IEEE Transactions on Acoustics, Speech, and Signal Processing, vol. 38, No. 8.
Jeffrey J. Rodriquez, An Improved FFT Digit–Reversal Algorithm, Aug. 1989, pp. 1298–1300, IEEE Transactions on Acoustics, Speech, and Signal Processing, vol. 37, No. 8.
Angelo A. Yong, A Better FFT Bit–Reversal Algorithm Without Tables, Oct. 1991, pp. 2365–2367, IEEE Transactions on Acoustics, Speech, and Signal Processing, vol. 39, No. 10.
Amitava Biswas, Bit Reversal in FFT From Matrix Viewpoint, Jun. 1991, pp. 1415–1418, IEEE Transactions on Signal Processing, vol. 39, No. 6.

*Primary Examiner*—Roy N. Envall, Jr.
*Assistant Examiner*—Chuong D. Ngo
*Attorney, Agent, or Firm*—Fliesler, Dubb, Meyer & Lovejoy

[57] ABSTRACT

A digit reversing system is disclosed for handling mixed radix FFT operations with arbitrary arrangements of radices. In a first step, all bits in an integer field of size $\log_2 N$ are position reversed. In a second step, subfields of the output produced in the first step are individually unreversed at the local level to produce unreversed digits. The output is used for appropriately arranging input terms applied to a mixed-radix multi-stage Fast Fourier Transform (FFT) process.

25 Claims, 6 Drawing Sheets

FIG. 2
200

| STAGE: | 1 | 2 | 3 | | |
|---|---|---|---|---|---|
| RADIX: | 2 X | 4 X | 4 | =N | =32 |

| | | | |
|---|---|---|---|
| i=00 | 00 | 00 | 0 |
| i=01 | 00 | 00 | 1 |
| i=02 | 00 | 01 | 0 |
| i=03 | 00 | 01 | 1 |
| i=04 | 00 | 10 | 0 |
| i=05 | 00 | 10 | 1 |
| i=06 | 00 | 11 | 0 |
| i=07 | 00 | 11 | 1 |
| i=08 | 01 | 00 | 0 |
| i=09 | 01 | 00 | 1 |
| i=0A | 01 | 01 | 0 |
| i=0B | 01 | 01 | 1 |
| i=0C | 01 | 10 | 0 |
| i=0D | 01 | 10 | 1 |
| i=0E | 01 | 11 | 0 |
| i=0F | 01 | 11 | 1 |
| i=10 | 10 | 00 | 0 |
| *** | | *** | |
| i=1F | 11 | 11 | 1 |

205

$D_3$ $D_2$ $D_1$

210

$D_1$ $D_2$ $D_3$

| | $D_1$ | $D_2$ | $D_3$ |
|---|---|---|---|
| i*=00 | 0 | 00 | 00 |
| i*=10 | 1 | 00 | 00 |
| i*=04 | 0 | 01 | 00 |
| i*=14 | 1 | 01 | 00 |
| i*=08 | 0 | 10 | 00 |
| i*=18 | 1 | 10 | 00 |
| i*=0C | 0 | 11 | 00 |
| i*=1C | 1 | 11 | 00 |
| i*=01 | 0 | 00 | 01 |
| i*=11 | 1 | 00 | 01 |
| i*=05 | 0 | 01 | 01 |
| i*=15 | 1 | 01 | 01 |
| i*=09 | 0 | 10 | 01 |
| i*=19 | 1 | 10 | 01 |
| i*=0D | 0 | 11 | 01 |
| i*=1D | 1 | 11 | 01 |
| *** | | *** | |
| i*=1F | 1 | 11 | 11 |

215

DIGIT REVERSE FOR MIXED RADIX FFT

This application is a continuation of Ser. No. 07/877,949, filed Apr. 30, 1992, now abandoned.

BACKGROUND

1. Field of the Invention

The invention is generally directed to digital signal processing. The invention is more specifically directed to a method for carrying out a mixed-radix Fast Fourier Transform.

2. Cross Reference to Related Patents

The following U.S. patent(s) is/are related to the present application and its/their disclosures is/are incorporated herein by reference:

(A) U.S. Pat. No. 5,029,079 issued Jul. 2, 1991 to Magar, et al, and entitled APPARATUS AND METHOD FOR FLEXIBLE CONTROL OF DIGITAL SIGNAL PROCESSING DEVICES.

3. Description of the Related Art

The Fast Fourier Transform (FFT) is a well known algorithm that is used in digital signal processing for transforming a set of N time-domain sample points into a corresponding set of N frequency-domain sample points. FFT processes find utility in a variety of applications, including machine-implemented speech recognition, image enhancement of video or tomography signals, adaptive filtering of digitized waveforms, and so forth.

The basic FFT equations are given below as Eq. 1 and Eq. 2.

$$\text{for } k = 0, 1, \ldots, N-1: X(k) = \sum_{i=0}^{N-1} x(i) W_N^{ik} \quad \text{(Eq. 1)}$$

$$W_N^{ik} = e^{-j(2\pi)ik/N} \quad \text{(Eq. 2)}$$

The time-domain samples are represented as $x(0)$ through $x(N-1)$. The frequency-domain components are represented as $X(0)$ through $X(N-1)$.

It is seen from the above Eq. 1 that each frequency-domain component $X(k)$ is a weighted sum of all N time-domain components, $x(0)$–$x(N-1)$. The weights $W_N^{ik}$ are referred to as twiddle factors.

Machine implemented computation of an FFT is often simplified by cascading together a series of simple multiply-and-add stages. When a recursive process is used, data circulates through a single stage and the computational structure of the stage is made variable for each circulation. Each circulation through the stage is referred to as a "pass".

A plurality of computational elements, each known as a radix-r butterfly, may be assembled to define a single stage for carrying out a particular pass. A radix-r butterfly receives r input signals and produces a corresponding number of r output signals, where each output signal is the weighted sum of the r input signals. The radix number, r, in essence, defines the number of input components which contribute to each output component.

By way of example, a radix-2 butterfly receives two input signals and produces two output signals. Each output signal is the weighted sum of the two input signals. A radix-3 butterfly receives three input signals and produces three corresponding output signals. Each output signal of the radix-3 butterfly constitutes a weighted sum of the three input signals.

Completion of an N-point Fast Fourier Transform (FFT) requires that the product of the butterfly radix values, taken over the total number of stages or passes, equals the total point count, N. Thus, a 64-point FFT can be performed by one radix-64 butterfly or two cascaded stages where each stage has eight radix-8 butterflies (the product of the radix values for stage-1 and stage-2 is 8×8=64) or six cascaded stages where each of the six stages comprises 32 radix-2 butterflies (the product of the radix values for stage-1 through stage-6 is 2×2×2×2×2×2=64).

It has been shown that a multi-stage or multi-pass FFT processes can be correctly carried out under conditions where the number of butterfly elements changes from one pass (or stage) to the next and the radix value, r, of the butterfly elements also changes from one pass (or stage) to the next. A paper by Gordon DeMuth, "ALGORITHMS FOR DEFINING MIXED RADIX FFT FLOW GRAPHS", IEEE Transactions on Acoustics, Speech, and Signal Processing, Vol 37, No. 9, September 1989, Pages 1349–1358, describes a generalized method for performing an FFT with a mixed-radix system. A mixed-radix system is one where the radix value, r, in one stage or pass is different from that of at least one other stage or pass.

An advantage of a mixed-radix computing system is that it can be "tuned" to optimize the signal-to-noise ratio of the transform (or more correctly speaking, to minimize the accumulated round-off error of the total transform) for each particular set of circumstances. By way of example, it may be advantageous in one environment to perform a 64-point FFT using the mixed-radix sequence: 2, 4, 4, 2. In a different environment, it may be more advantageous to use the mixed-radix sequence: 4, 2, 4, 2. Round-off error varies within a machine of finite precision as a function of radix value and the peak signal magnitudes that develop in each stage or pass.

The DeMuth mixed-radix algorithm calls for a particular shuffle of input signals at the first stage of a multi-pass processor. The shuffle is dependent on the specific sequence of radixes used in the mixed-radix system. A 2, 4, 4, 2 radix sequence might use a specific, first input shuffle while a 4, 2, 4, 2 radix sequence uses a completely different, second input shuffle.

The shuffle algorithm described by DeMuth is referred to here and elsewhere as "digit reversal".

Conceptually speaking, digit reversal starts off by ordering the input signals or components in numerical sequence, $x(0)$, $x(1)$, $x(2)$, ..., $x(N-1)$. The index number, $i$, of each input component, $x(i)$ is then converted to a binary representation, with the total number of bits used to represent each index value, $i$, being equal to $\log_2 N$. For the case of $N=64=2^6$, each index number, $i$, would be represented by a field of six bits.

Next, each field is subdivided into a plurality of "digits". The number of digits is equal to the number of stages in the multi-pass or multi-stage mixed-radix system. The number of bits used to represent each digit is equal to $\log_2 r_m$, where $r_m$ is the radix value of the corresponding stage-m.

The collection of bits used to define a digit in this manner is referred to here as a "subfield". A one-bit wide subfield defines the corresponding digit of a radix-2 stage. A two-bit wide subfield defines the corresponding digit of a radix-4 stage. A three-bit wide subfield represents the corresponding digit of a radix-8 stage, and so on.

For the case of a mixed-radix sequence, $r_1$ $r_2$ $r_3$ $r_4$, which is specifically defined by the integer sequence: 2, 4, 4, 2; the product N is 64, and the resulting binary-coded representation of the index value i, is the 6-bit wide, four-digit wide sequence:

$$i_{bin} = D_4\ D_3\ D_2\ D_1,$$

where $D_4$ is one bit wide, $D_3$ is 2-bits wide, $D_2$ is 2-bits wide, and $D_1$ is one bit wide. The symbol $r_1$ is the radix of stage-1, which is the stage that receives the initial input signals, $x(0)$ through $x(N-1)$.

The above symbol, $r_2$, is the radix of the second stage which receives the output signals developed by the first stage, and so forth. $D_1$ is the digit developed for the radix-$r_1$ stage. $D_4$ is the digit developed for the radix-$r_4$ stage. Accordingly, $D_4$ is defined by the left most (most significant) bit in the 6-bit wide binary-coded field, $i_{bin} = D_4\ D_3\ D_2\ D_1$. $D_1$ is defined by the right most (least significant) bit.

Once this is done, a shuffled index value, i*, is formed simply by reversing the order of digits from a left-to-right order to a right-to-left order. More specifically, in a four-stage system, the shuffled index becomes:

$$i^* = D_1\ D_2\ D_3\ D_4$$

where the reversed digits represent the same set of bits they represented in the original index number, $i = D_4\ D_3\ D_2\ D_1$. The most significant digit in i* is $D_1$. The most significant digit in i is $D_4$.

After digit reversal is performed, input components are presented sequentially to the first stage (or pass) of the multi-stage (or multi-pass) system according to the sequence $x(i^*)$ where i* is the digit-reverse transform of the natural sequence $i=0, 1, 2, 3, \ldots, N-1$.

A number of techniques have been proposed for automatically generating digit-reversed sequences. The following papers are representative of the proposed techniques: (a) J. J. Rodriguez, "An Improved FFT Digit-Reversal Algorithm", IEEE Transactions on Acoustics, Speech, and Signal Processing, Vol. 37, No. 8, August 1989, Pages 1298–1300; (b) J. S. Walker, "A New Bit Reversal Algorithm", IEEE Transactions on Acoustics, Speech, and Signal Processing, Vol. 38, No. 8, August 1990, Pages 1472–1473; (c) A. A. Yong, "A Better FFT Bit-Reversal Algorithm Without Tables", IEEE Transactions on Acoustics, Speech, and Signal Processing, Vol. 39, No. 10, October 1991, Pages 2365–2367; and (d) A. Biswas, "Bit Reversal In FFT From Matrix Viewpoint", IEEE Transactions on Signal Processing, Vol. 39, No. 6, June 1991, pages 1415–1418. Generally speaking, machine implementation of the proposed techniques is limited by undue complexity and/or inflexibility and/or slow execution speed.

Recently, a class of high-speed, user-programmable digital signal processor chips (DSP's) have been introduced. The Sharp LH9124 digital signal processor is representative of these devices. It can be programmed to perform single-pass multi-butterfly operations in the radix-2 or radix-4 format.

The utility of such a multi-radix DSP chip can be greatly enhanced if an automated method were provided for shuffling input data for any arbitrary mix of different or identical radix values. Previously known shuffle techniques suffer from limited flexibility and/or slow execution speed.

SUMMARY OF THE INVENTION

Digit reversal is implemented in accordance with the invention by using what is essentially a two-step process.

In the first step, all bits in the binary-coded field, $i_{bin}$, which represents a particular index value, i, are order-reversed without regard to digit-affiliation. The result is a reversed intermediate index field, $ii_{bin}$. The effective width of both the original field, $i_{bin}$, and the intermediate field, $ii_{bin}$ is equal to $\log_2 N$ bits.

In the second step, subfields of the intermediate index field ($ii_{bin}$) are affiliated with specific digits and those subfields are each, individually order-reversed. Each subfield constitutes $\log_2 r_m$ bits, where $r_m$ is the radix value of a corresponding stage-m. No reversal is required for subfields corresponding to radix-2 stages (one-bit wide digits). The second step produces the digit reversed index field, $i^*_{bin}$.

An apparatus in accordance with the invention includes a reversed-field generating circuit for generating order-reversed signals in which all the bits of a given index field ($i_{bin}$) having a bit count equal to $\log_2 N$ are order reversed. The apparatus further includes a digit-unreversing circuit for affiliating specific subfields of the order-reversed field produced by the reversed-field generating circuit with specific digits and for reversing those subfields to thereby produce a field containing appropriately placed, nonreversed digits.

In one embodiment of the invention, the reversed-field generating circuit comprises a binary adder and an accumulating register having an input coupled to the output of the binary adder. A bit reversed version of the binary value N/2 is supplied to a first port of the adder. The output of the accumulating register is fed back to a second port of the adder in straightforward fashion. At the same time, the output of the accumulating register is also output in bit reversed form to thereby generate a sequence of signals having bit-reversed binary fields of width $\log_2 N$.

A plurality of digit-unreversing multiplexers are provided at the output of the reversed-field generating circuit for unreversing the digits of radix-2 or higher radix stages.

BRIEF DESCRIPTION OF THE DRAWINGS

The invention will be described with reference to the following drawings, in which:

FIG. 2 diagrams the conventional digit reverse process.

DETAILED DESCRIPTION

Figure 1:
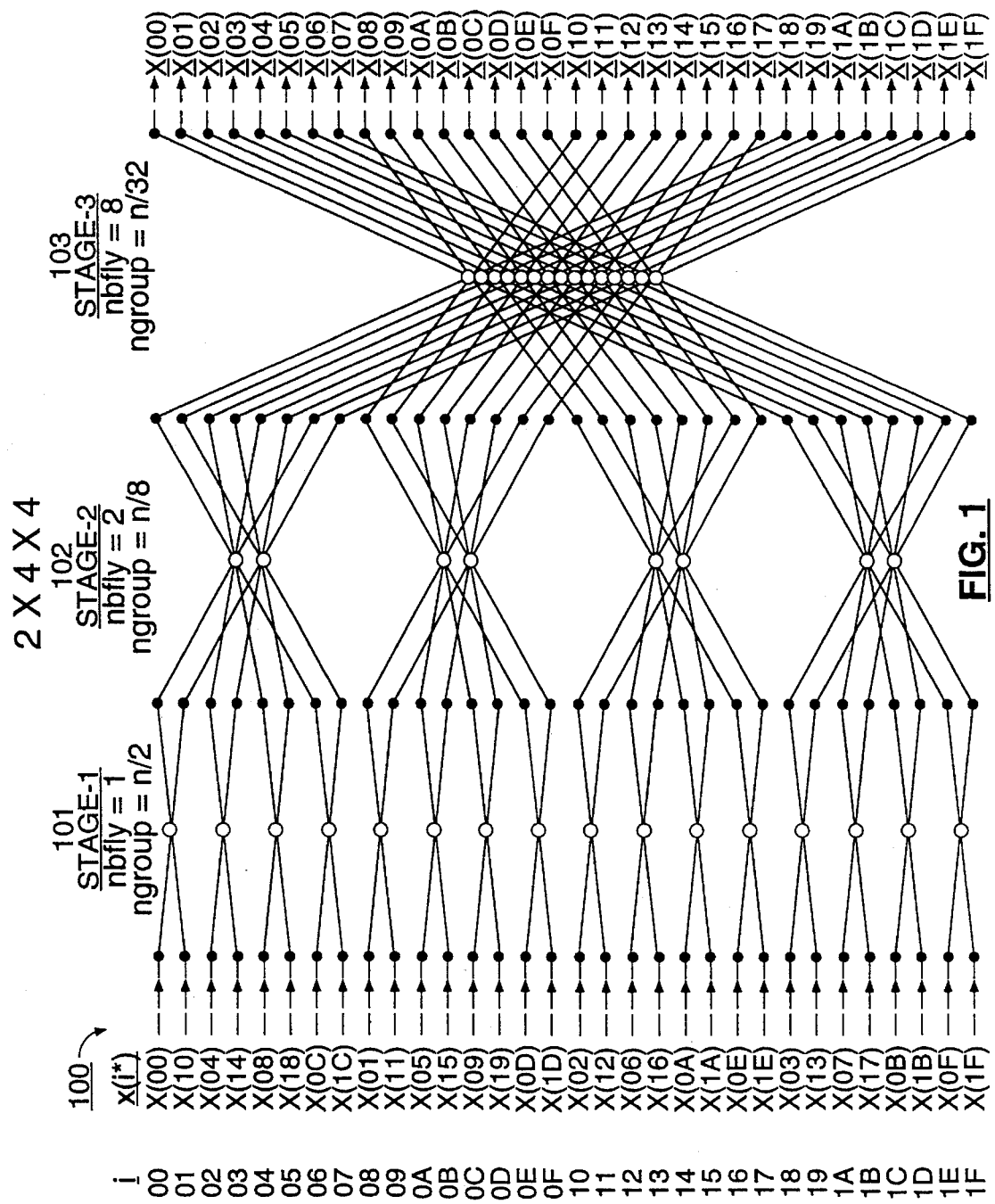
FIG. 1 is a flow diagram of a 32-point mixed-radix FFT process in which the radix sequence is 2, 4, 4.

FIG. 1 illustrates signal-flow in a three-stage mixed-radix FFT system 100 for which the radix sequence is 2, 4, 4. The total number of input samples, x(00) through x(1F), is $2 \times 4 \times 4 = 32 = N$.

Stage-1 comprises sixteen radix-2 butterfly elements as shown at 101. Stage-2 comprises eight radix-4 butterfly elements as shown at 102. Stage-3 also has eight radix-4 butterfly elements as shown at 103.

Input signals x(i*), are applied in a prespecified order at the left side of the system 100 and output signals X(k) are produced at the right side of the system.

The order in which the input signals x(i*) need to be applied at the left side of the system is illustrated in FIG. 1. The symbol, i, is used to represent the natural ordering of numbers 0, 1, 2, ..., N−1. These values are shown in hexadecimal format in FIG. 1 for the case of N=32= $20_{hexadecimal}$.

The shuffled index notation, i*, indicates the order in which the input components, x(i*) have to be presented to the respective butterfly input nodes of the first stage 101 of system 100 when the input nodes are sequentially numbered as i=0 through i=N−1.

FIG. 2 illustrates the conventional digit reversing method for the case where the mixed radix sequence is 2, 4, 4. First, the binary representations $i_{bin}$ of the values i=0, 1, 2, ..., N−1 are arranged vertically one above the next, in the stated order, as shown by matrix 205. A five-bit wide binary field is used to represent each value, i. For convenience, the hexadecimal representations of each value, i, is shown at the left side of FIG. 2

Next, matrix 205 is subdivided into three columns, labelled $D_1$, $D_2$, and $D_3$, in right to left order. Looking at each row, each 5-bit wide binary field, $i_{bin}$, is subdivided into a $D_1$ subfield, a $D_2$ subfield and $D_3$ subfield as shown.

The $D_1$ subfield corresponds to the first radix-2 stage of the FFT system 100 and it consumes the first, least significant bit of the corresponding binary field $i_{bin}$. The $D_2$ subfield corresponds to the radix-4 second stage of system 100 and it consumes the next two bits of the binary field $i_{bin}$. The $D_3$ subfield corresponds to the last radix-4 stage of system 100 and it consumes the remaining two bits of the five-bit wide field, $i_{bin}$.

The digit order is then reversed, as indicated at 210, to produce the i* subfields. Digit column $D_3$ defines the two least significant bits of the i* field. Digit column $D_2$ defines the next two bits of the i* field. Digit column $D_1$ defines the most significant bit of the i* field. Note that the bits remain in their original order within each of the 2-bit wide columns, $D_2$ and $D_3$.

Figure 3:
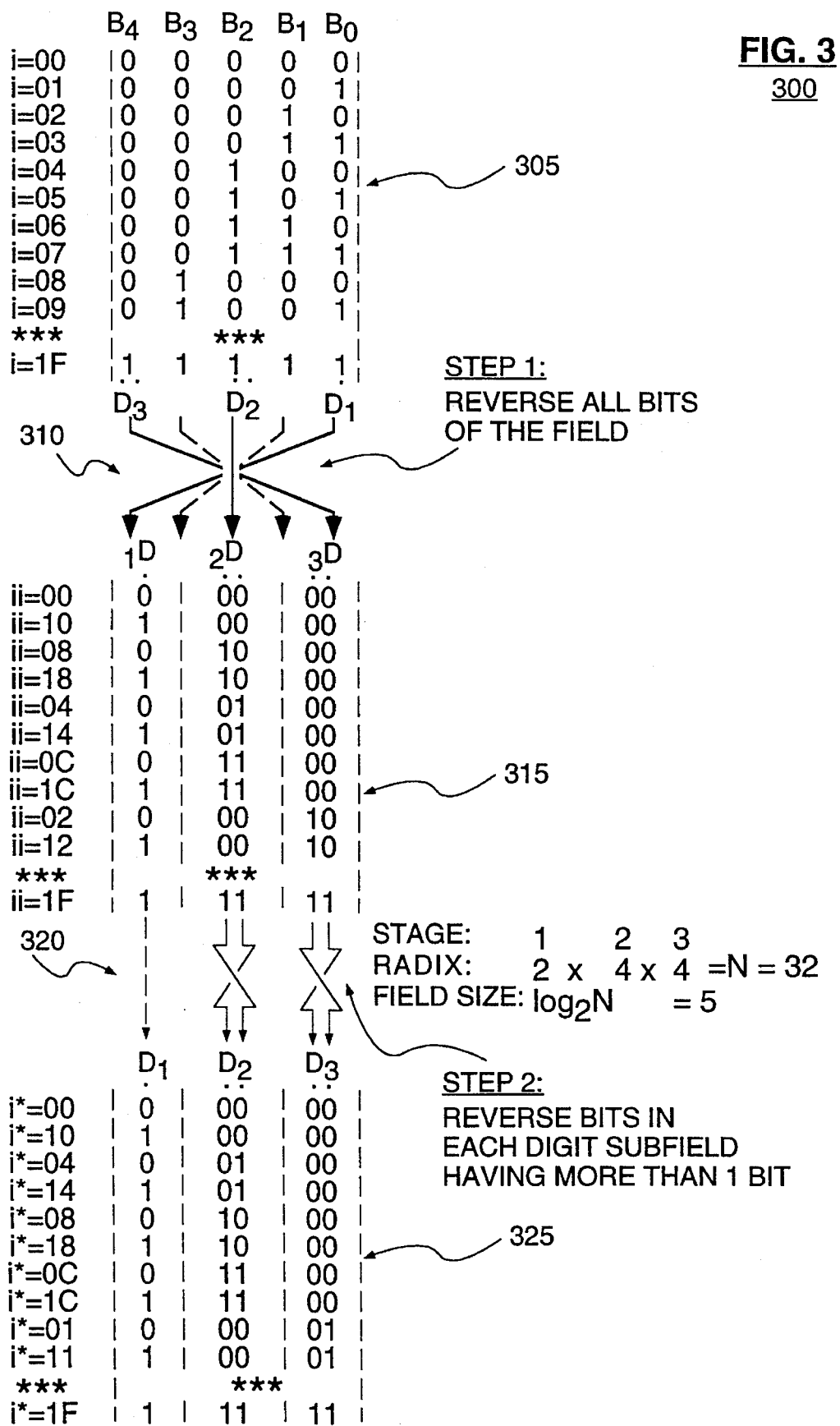
FIG. 3 shows how digit reversal is carried out in accordance with the invention for the radix sequence: 2, 4, 4.

FIG. 3 shows a method 300 in accordance with the invention for generating the shuffled index, i*. Index values, i, are initially arranged in natural order, 0, 1, 2, ..., N−1; and represented in binary form as shown by matrix 305. Note that matrix 305 does not indicate any particular affiliation between the respective bits ($B_4$-$B_0$) of each binary field, $i_{bin}$, and the radix number of each stage in FFT system 100.

In a first reversing step 310, the left to right ordering of all bits in matrix 305 is reversed, without regard to digit affiliation. This produces a new, intermediate matrix 315. Step 310 is referred to as field-reversal. The 5-bit wide binary field representing each index value, i, is reversed to create a corresponding intermediate value, ii.

The rows of the resulting intermediate matrix 315 represent the intermediate index values, ii, for i equal 00 through 1F. The hexadecimal value of each row, ii= 00, ii=10, ii=08, ii=18, ii=04, ii=0C, ii= 1C, ..., ii=1F, of intermediate matrix 315 remains the same regardless of digit affiliation.

In a subsequent step, the intermediate matrix 315 is subdivided into vertical columns of bit widths; 1, 2, 2, in left to right order. This corresponds to the base-2 logarithm ($log_2$) of the radix value of respective stages 101, 102 and 103 (FIG. 1). The sum of the individual column widths is 1+2+2=5 which is the same as $log_2 N$.

The left column of intermediate matrix 315 is labeled $_1D$ for reasons that will become apparent shortly. The middle column of matrix 315 is labeled $_2D$. The right column of matrix 315 is labeled $_3D$.

It is observed that the 1-bit wide columns of original matrix 305 are labeled in left to right order (most to least significant position) as $B_4$, $B_3$, $B_2$, $B_1$ and $B_0$. It is further observed that, under the conventional method of FIG. 2, a digit affiliation of $D_3$ =$B_4 B_3$, $D_2$=$B_2 B_1$ and $D_1$=$B_0$, would have been assigned to matrix 305. The field-reversal step, 310, then produces the following result in intermediate matrix 315: $_3D$=$B_3 B_4$, $_2D$=$B_1 B_2$ and $_1D$=$B_0$.

If the subfields of respective columns $_2D$ and $_3D$ in matrix 315 are reversed, each about its respective central axis, the digit subfields $D_2$ and $D_3$ would be reproduced.

This is basically what is done in the second reversal step 320. Step 320 is referred to as subfield-reversal or digit-unreversal. (It is called digit unreversal because the reversed digit representation, $_3D$ for example, is transformed into the nonreversed digit representation, $D_3$.) The bits of each digit subfield having more than one bit are reversed about their respective vertical axis of symmetry to produce the bottom matrix 325.

The rows of the resulting matrix 325 contain the correct shuffled index (in hexadecimal format): i*=00, i*=10, i*=04, i*=14, i*=08, i*=18, ..., i*=1F, for the mixed-radix sequence: 2, 4, 4.

Figure 4:
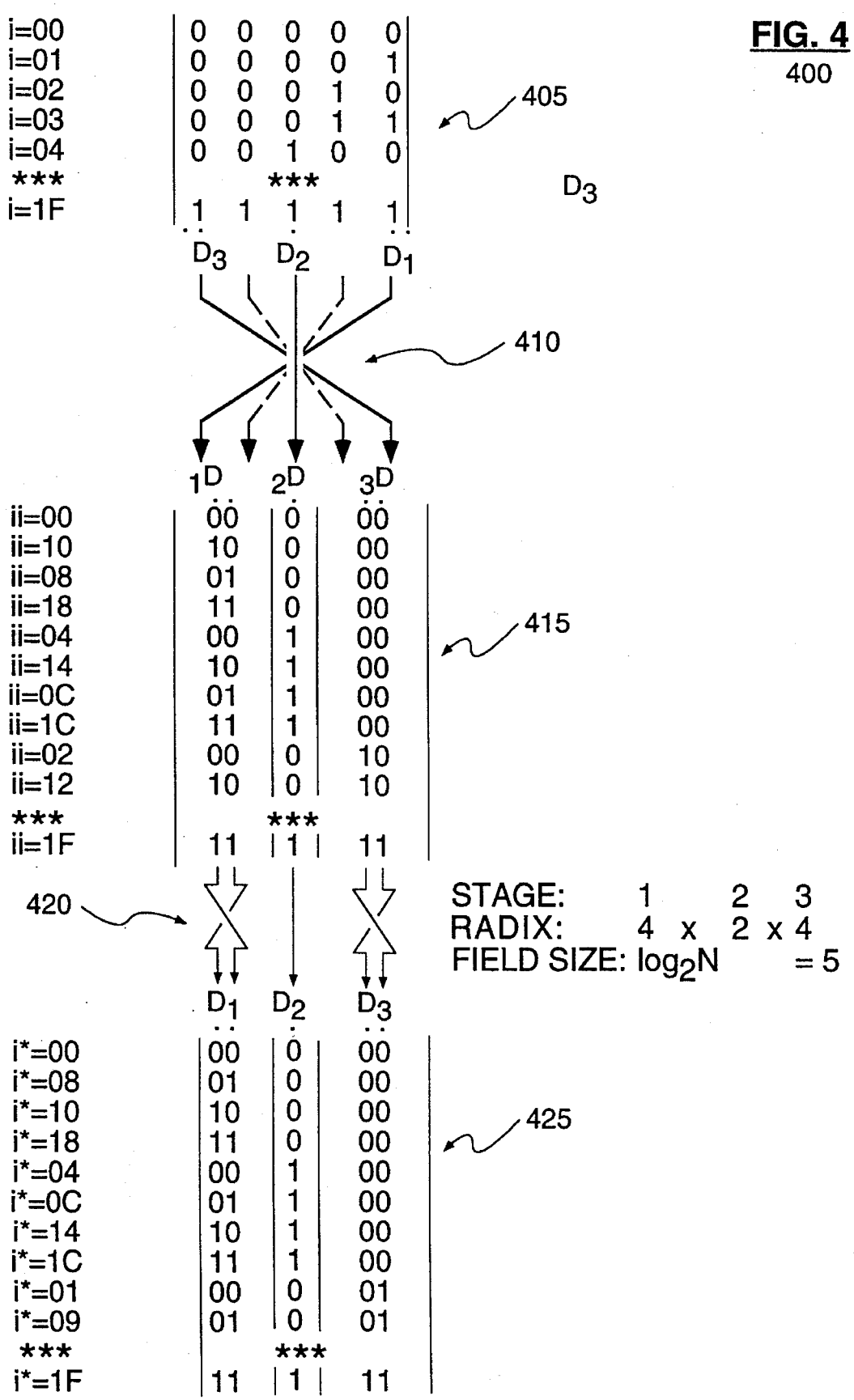
FIG. 4 shows how digit reversal is carried out in accordance with the invention for the radix sequence: 4, 2, 4.

FIG. 4 shows a similar index-generating process 400 for an FFT system having the radix sequence 4, 2, 4. Reference numbers in the "400" number series are used in FIG. 4 to correspond to like reference numbers in the "300" number series of FIG. 3.

The index field size is once again, $log_2 N$= $log_2(4 \times 2 \times 4)$=5. Matrix 405, like matrix 305, is simply the natural ordering of the index values i=00 through 1F, in top to bottom sequence, with each row being a 5-bit wide binary representation of the corresponding value i=00, i=01, i=02, ..., i=1F.

Step 410 is identical to field-reversal step 310. The left-to-right ordering of columns in matrix 405 is reversed to produce matrix 415. The binary values of each row in matrix 415 are thus identical to those of matrix 315.

The first difference between FIG. 3 and FIG. 4 is seen in the subdivision of intermediate matrix 415 into respective columns $_1D$, $_2D$ and $_3D$. Column $_1D$ is two-bits wide in FIG. 4. Column $_2D$ is one-bit wide. Column $_3D$ is two-bits wide.

At step 420, the bits of each digit subfield are reversed about their respective vertical axes of symmetry. This produces bottom matrix 425 which is now different from matrix 325. The shuffled index values of matrix 425 are respectively i*=00, i*=08, i*=10, i*=18, i*=04, i*=0C, i*=14, i*=1C, i*=01, i*=09, ..., i*=1F.

While not shown, it is to be understood that a third shuffling of index values could have been produced by reversing the most significant pair of bits in intermediate matrix 415, reversing the next pair of significant bits in matrix 415 and reproducing the least significant column of 415 as is. The resulting matrix (not shown) would correspond to an FFT system having a radix sequence of: 4, 4, 2.

The above approach can be expanded to cover index fields of any width, $log_2 N$ and any arbitrary mix of radices $r_1 \times r_2 \times ... r_n$=N; where n is the number of stages and $r_m$ is the radix value of a particular stage-m. A first step according to the invention is to generate signals representing a natural ordering of integers, in binary representation, with field size $log_2 N$ and the left-to-right ordering of bits reversed within the $log_2 N$-wide field.

A second step of the invention is to then assign the bits of each field to a respective subfield $_m D$ of length $log_2 r_m$. Finally, the bits in each $_m D$ subfield having more than one bit are reversed (to thereby unreverse the reversed digit contained in the subfield and) to thereby regenerate their original digit values, $D_m$.

Figure 5:
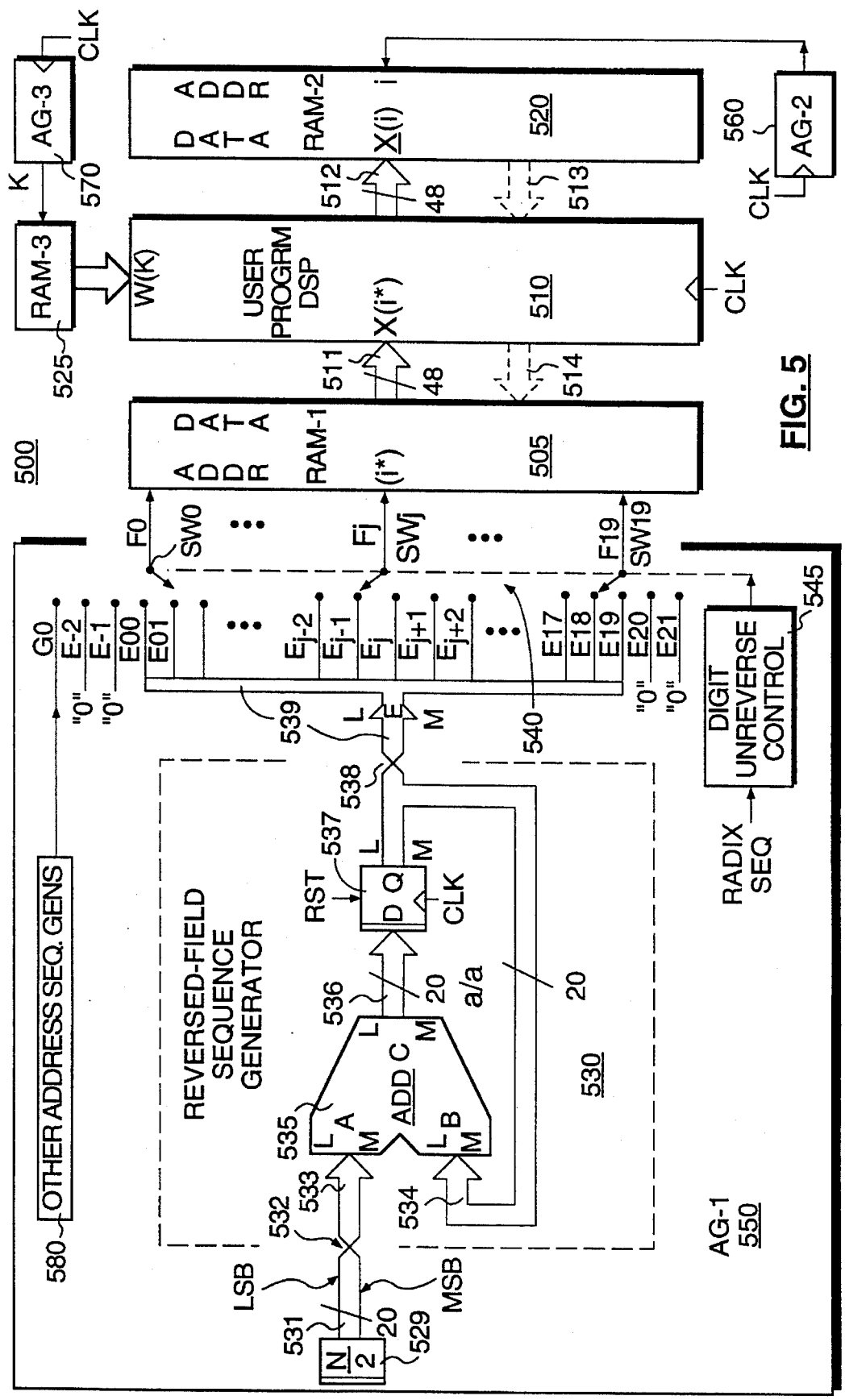
FIG. 5 is a diagram of a DSP system including a digit reversal circuit in accordance with the invention.

FIG. 5 is a block diagram of a digital signal processing system 500 in accordance with the invention. System 500 includes a user-programmable Digital Signal Processing (DSP) unit 510 having a first input port 511 for receiving a predefined sequence of input data, x(i*) and a first output port 512 for outputting correspondingly processed output data, X(i). The input data x(i*) is a shuffled version of original input data x(i). The original input data can represent sample points of a variety of different signals including, signals in a machine-implemented speech recognition system, video or tomography signals, telecommunication signals which are to undergo adaptive filtering, and so forth.

The Sharp LH9124 DSP chip is an example of a one-chip integrated circuit which may be used for implementing DSP unit 510. The LH9124 is a four-port device. Input data x(i*) is typically delivered to the first port 511 of the LH9124 from a first random access memory unit (RAM-1) 505. The LH9124 (510) is user-programmed to implement the first stage (e.g. 101, FIG. 1) of an FFT or other digital transform during a first "pass". It implements the second stage (e.g. 102, FIG. 1) of an FFT or other digital transform during a second pass and so on.

During the first pass, input data x(i*) moves from the source memory (RAM-1) 505 by way of path 511 into the DSP unit 510. The input data is partially-processed during the first pass. Resulting output data is stored in a second random access memory unit (RAM-2) 520.

During each pass, twiddle factors W(k) are supplied to the DSP unit 510 from a third memory unit (RAM-3) 525. The second memory unit (RAM-2) 520 receives address signals from a corresponding address generator (AG-2) 560. The third memory unit (RAM-3) 525 receives address signals from another corresponding address generator (AG-3) 570.

In one embodiment, the input data x(i*) is 48 bits-wide, the output data X(i) is 48-bits wide (24 bits for the real part and 24 bits for the imaginary part) and the twiddle data W(k) is 48-bits wide. RAM-1 and RAM-2 can each have a storage capacity be as large as one mega-word ($2^{20}$ words), where a word is 48 bits wide.

As the first pass completes, the DSP unit 510 is reconfigured to implement the second stage (e.g. 102, FIG. 1) of the transform process (e.g. FFT) and intermediate result data x(j) stored in RAM-2 (520) then ping-pongs back through the DSP unit 510 by way of second input path 513 (dashed) and second output path 514 (dashed) for storage in the RAM-1 unit (505).

As the second pass completes, the DSP unit 510 is once again reconfigured to implement the third stage (e.g. 103, FIG. 1) of the transform process. Intermediate result data x(j') stored in RAM-1 (505) again ping-pongs through the DSP unit 510 by way of input port 511 and output port 512, to produce the final result data X(i) which is then stored in the RAM-2 unit (520).

A first address generating chip (AG-1) 550 connects to the address input port of the RAM-1 unit 505 for generating the sequence of start address values, i*, which will produce a corresponding initial sequence x(i*) of digital signals at the data output port of the RAM-1 unit 505 as required by the DSP unit 510. The AG-1 chip also generates intermediate sequence j' for the intermediate data signals x(j') of the third pass. FIG. 5 shows the internal structure of the AG-1 chip 550. Chip 550 is implemented with 0.8 micron line width CMOS technology on a silicon substrate. Other technologies can also be used.

The second address generating chip (AG-2) 560 which drives the address input port of the RAM-2 unit 520 is internally structured the same as the AG-1 chip 550. It includes so-called "other sequence generating circuits" (580) for generating the appropriate storage address sequences required for intermediate and final output data stored in the RAM-2 unit 520. Among the other sequence generating circuits (580) is a natural order sequence generator which is simply a conventional binary counter. The natural order sequence generator within the AG-2 chip 560 is used for supplying the natural sequence index values, i, to the address port of RAM-2 (520) as final data X(i) is unloaded from the DSP unit 510 in the third pass.

The third address generating chip (AG-3) 570 also has an internal structure similar to that of the first and second address generating chips (AG-1 and AG-2) 550 and 560. Its other sequence generators (580) include so-called butterfly weighting sequences for delivering the appropriate twiddle factors W(k) to the DSP unit 510. Twiddle-factor sequencing is outside the scope of the present invention.

The DSP unit 510, the AG-1 unit 550, the AG-2 unit 560 and the AG-3 unit 570 all operate in synchronism with a system clock, CLK.

Referring to the internal structure of the first address generating chip (AG-1) 550, it comprises a monolithic silicon substrate on which there are defined: a reversed-field sequence generator 530, a digit unreversing unit 540 and one or more alternate address sequence generators 580.

The reversed-field sequence generator 530 comprises a 20-bit wide input bus 531, a 20-bit wide binary adding unit 535, a 20-bit wide accumulating register 537 and a 20-bit wide output bus 539. Generator 530 also includes bus-twists 532 and 538.

Adding unit 535 is a 2-port combinatorial logic device having a first input port A, a second input port B and an output port C. A 20-bit wide intermediate bus 536 couples the adding unit output port, C, to the D data input port of accumulating register 537. A 20-bit wide feedback bus 534 couples the Q output port of register 537 back to the B input port of adding unit 535. The combination of adding unit 535, intermediate bus 536, register 537 and feedback bus 534 defines a conventional adder/accumulator circuit which is well known in the art.

Each input/output port of the adder/accumulator combination is labeled with a "L" at its topside to represent the least significant bit of received data and a "M" at its bottom side to represent the most significant bit of received data.

Signal-coupling is straightforward in the adder/accumulator combination (hereafter also "a/a combination"). The least significant (L) bit at the output port of each unit within the a/a combination becomes the least significant (L) bit at the input port of the subsequent unit within the a/a combination. The most significant (M) bit at the output port of each unit within the a/a combination becomes the most significant (M) bit at the input port of the subsequent unit in the a/a combination. Intermediate bits between the L and M positions are similarly coupled in a straightforward manner within the a/a combination.

The first bus-twist, 532, is provided between the input bus 531 of generator 530 and a secondary input bus 533 which feeds the A input port of adding unit 535. The least significant bit of (LSB) of input bus 531 becomes the most significant bit (M) of input port A. The most significant bit (MSB) of input bus 531 becomes the least significant (L) bit of input port A.

A user-programmed register 529 supplies a binary-coded signal representing the value N/2 to input bus 531. N is equal to the product of all the radices of the butterfly operations to be carried out in the DSP unit 510. Shift circuitry may be provided on chip 550 for receiving a signal representing the value N and converting it to one representing N/2 prior to storage in register 529.

In the case where the radix mix to be carried out is 2×4×4, the value of N/2 would be 16 in decimal representation or 000 . . . 010000 in binary representation. The number of zeroes preceding the "1" bit is 20–5=15 (=20-log$_2$N). This is because input bus 531 is 20-bits wide. The 20-bit wide field presented to the A input port of adding unit 535 would be 000010 . . . 000 in this case.

Register 537 is reset by a RST pulse at the start of signal processing. For the case of N=32, register 537 outputs the value 000000 . . . 000 in the first clock cycle, the value 000010 . . . 000 in the second clock cycle, the value 000100 . . . 000 in the third clock cycle, the value 000110 . . . 000 in the fourth clock cycle, the value 001000 . . . 000 in the fifth clock cycle, and so on. When the port B input reaches the value, 111110 . . . 000, the process completes. An on-chip state controller (not shown) counts out the N sequence steps and indicates the end of the process.

The second bus-twist, 538 is provided between the feedback bus 534 and the output bus 539 of generator 530. The least significant (L) bit of bus 534 becomes the most significant (M) bit of output bus 539. The most significant (M) bit of feedback bus 534 becomes the least significant (L) bit of output bus 539.

Using the above example for the case of N=32, it is seen that the 20-bit wide output of bus 539 follows the sequence: 000 . . . 000000, 000 . . . 010000, 000 . . . 001000, 000 . . . 011000, and so forth. The least significant 5 bits (5=log$_2$N) of the code output on bus 539 correspond to the sequence of 5-bit wide values in intermediate matrix 315 (FIG. 3).

When other values of N are considered, it is seen that the reversed-field generator 530 produces a sequence of 20-bit wide output signals whose least significant log$_2$N bits are the desired reversed field to be produced by field-reversal step 310 in FIG. 3. This is true for any value of N which is an integral power of 2.

One way to understand the operation of the reversed-field generating circuit 530 is to position a rectangular mirror with one of its edges set alongside the left side of matrix 315 (or 415) and to look at the mirror image of the matrix. The observed image shows a simple binary up-count, 00, 01, 10, 11, 100, and so forth.

With the mirror still positioned at the left side of matrix 315, assume there are leading zeroes in front of the non-mirrored matrix 315, but you can not see them because the mirror covers them up. In the mirror-image, these leading zeroes (not shown in matrix 315 or 415) become trailing zeroes. The value N/2 is equal in binary representation to a "1" followed by the unshown number of leading zeroes. When the N/2 field is order reversed, the leading zeroes become trailing zeroes. The adder/accumulator (a/a) combination simply increments its accumulated value by a binary value represented as a 1 followed by the aforementioned number of trailing zeroes.

Referring to the output bus, 539, of the reversed-field generator, the field-reversed signal present on that bus 539 is referenced as signal E in FIG. 5. The individual lines of bus 539 are referenced as $E_{00}$ through $E_{19}$. Line $E_{00}$ carries the least significant bit of bus 539. Line $E_{19}$ carries the most significant (M) bit of bus 539.

Lines $E_{00}$ through $E_{19}$ of output bus 539 are distributed to a plurality of twenty multiplexing switches, SW0, SW1, SW2, . . . , SWj, . . . , SW19. The switches, SW0–SW19, in combination with digit unreverse control unit 545 form the digit-unreverse unit 540. The outputs of digit-unreverse unit 540 are correspondingly referenced as $F_0$ through $F_{19}$.

For sake of illustrative brevity, only switches SW0, SWj and SW19 are shown.

The output of switch SWj is referenced as $F_j$. Similarly, the output of switch SW0 is referenced as $F_0$ and the output of switch SW19 is referenced as $F_{19}$. The signal on output line $F_0$ serves as the least significant address bit for the RAM-1 unit 505 while the signal on output line $F_{19}$ serves as the most significant address bit of RAM-1. For cases where RAM-1 has a storage capacity of less than $2^{20}$ data words (1-Megaword), the more significant address bits, $F_{19}$, $F_{18}$, etc. are not used.

The armature of each switch SWj is individually controlled by the digit unreverse control unit 545. Each switch SWj receives at least lines $E_{j-i}$, $E_j$ and $E_{j+1}$ as its inputs. The switch can have additional inputs such as the illustrated $E_{j-2}$, $E_{j+2}$. The number of inputs can be expanded in pairs to further include inputs $E_{j-3}$, $E_{j+}$ (not shown) and so forth, as needed.

The digit unreverse control unit 545 operates the symbolic armature of each switch, SWj to select the signal on one of the input lines as the signal to be output on the corresponding output line $F_j$.

Each switch $SW_j$ can be implemented by an electronic multiplexer or like means. The symbol of a swinging armature and surrounding input contacts is used to illustrate clearly how digit unreverse operates. Note for example that the symbolic armature of switch $SW_0$ is drawn extending to the left and downwardly to connect to input line $E_{01}$. The symbolic armature of switch $SW_j$ is drawn extending to the left and downwardly to connect to input line $E_{j-1}$. If j is assumed equal to one, FIG. 5 then shows digit unreversal by the connections formed from $E_{01}$-to-$F_0$ and $E_{00}$-to-$F_1$.

The required number of inputs for each switch SWj is given by the formula: $2([\log_2 R_M]-1)+1$; where $R_M$ is the highest radix value to be used in the transform performed by the DSP unit 510. By way of example, if the highest radix value to be used is a radix of eight, each switch SWj should have $2([\log_2 8]-1)+1=5$ inputs. If the highest radix value is sixteen, then a minimum of seven inputs is required. On the other hand, if the maximum radix value is four, only three inputs are needed for each switch SWj.

In the case where all switches SW0–SW19 are of identical structure, grounded dummy lines such as the illustrated $E_{-2}E_{-1}$, $E_{20}$ and $E_{21}$ should be provided at the boundary switches SW0 and SW19 to prevent inputs $E_{-2}$, $E_{-1}$, $E_{20}$ and $E_{21}$ from floating to arbitrary values.

In addition to inputs $E_{j-2}$ through $E_{j+2}$, each multiplexer switch SWj can connect its output line $F_j$ to another set of one or more inputs, $G_j$ (only $G_0$ shown). These other inputs $G_j$ are supplied from one of a plurality of other address sequence generators 580. The other address sequence generators 580 include a natural sequence generator (a conventional binary counter as already mentioned), a sequencer for generating twiddle factor selecting values, k, a sequencer for selecting corresponding data x(j) or x(j') of intermediate passes, and other such sequencers.

Assume that the address signals on address lines $F_0$ and $F_1$ (latter not shown) are associated with a radix-4 stage. For purposes of digit-unreverse, the unreverse control unit 545 will operate switch SW0 to couple line E01 to output line $F_0$. At the same time, the unreverse control unit 545 will operate switch SW1 (not shown) to connect its output line $F_1$ to line E00. Digit unreverse will therefore occur at address positions $F_0$ and $F_1$.

Assume further that address bit $F_2$ is associated with a radix-2 operation. The unreverse control unit 545 will operate its respective switch, SW2 (not shown) to connect bus lines E02 to the respective output line $F_2$.

Digit unreverse control unit 545 includes appropriate logic for indicating the sequence of radix values to be used in each successive stage of the FFT transform process and for operating each of the switches SWJ to implement the appropriate digit unreversal as needed or not.

Figure 6:
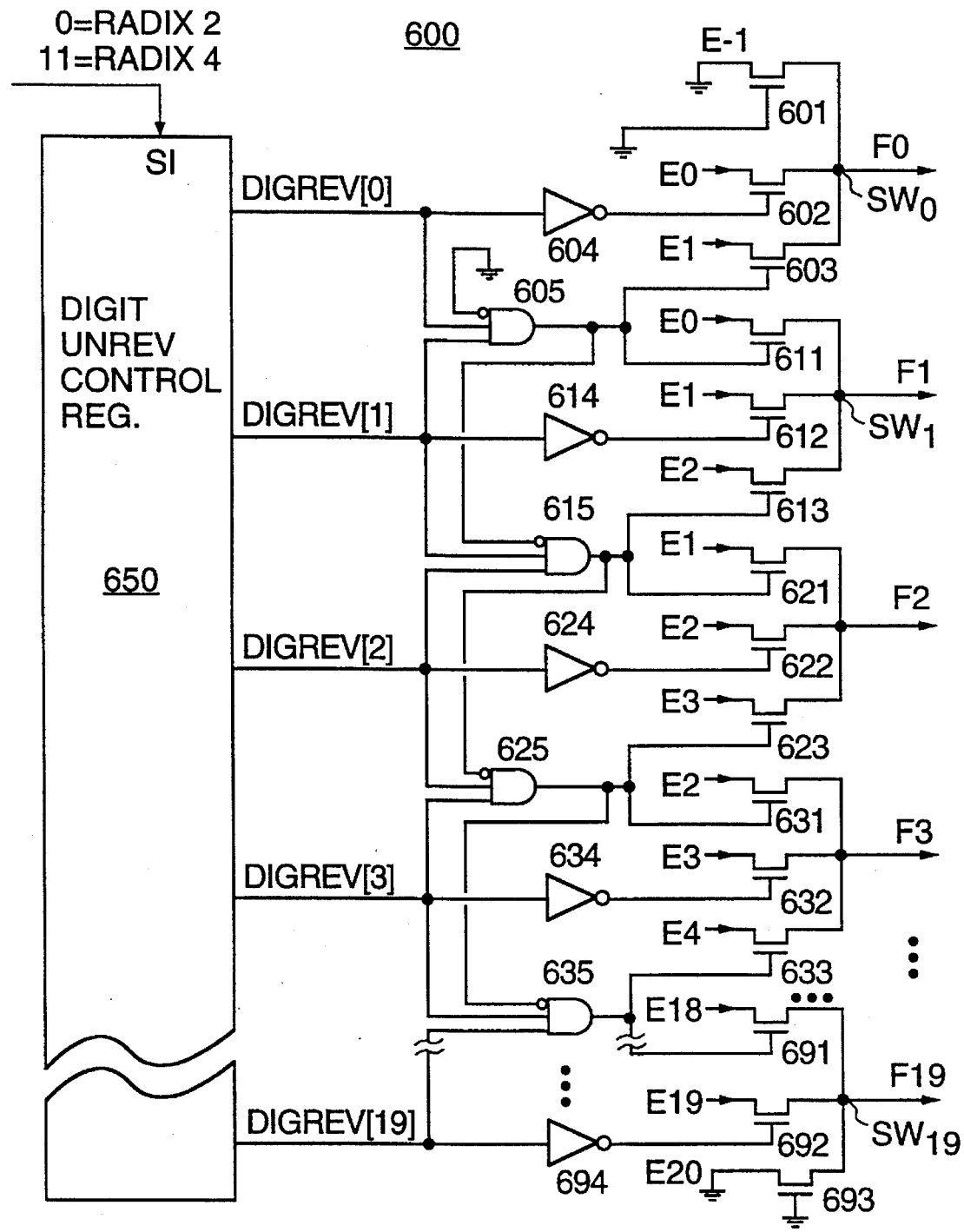
FIG. 6 is a schematic diagram of a digit unreversing circuit in accordance with the invention.

FIG. 6 is a schematic diagram of one particular digit unreverse unit 600 and its associated multiplexing switches. Unit 600 includes a 20-bit long control register 650 in combination with control logic gates 604, 605, 614, 615, 624, 625, 634, 635, . . . , 694.

Control data is loaded into register 650 either by way of a serial input port, SI, or by way of a parallel load port (not shown). A zero ("0") bit is loaded into register 650 for each corresponding stage of butterfly elements which is to perform a radix two operation. A pair of logic ones ("11") is loaded into control register 650 for each stage that is to perform a radix four operation.

In the illustrated embodiment 600, switch SW0 comprises three N-channel pass transistors (MOSFET's), 601, 602 and 603. The source and gate terminals of transistor 601 are grounded. The source of transistor 602 is coupled to output line E0 of the reversed-field sequence generator 530 (not shown in FIG. 6). The source of transistor 603 is coupled to line E1. The drains of transistor 601, 602 and 603 all connect to output line $F_0$.

The twenty parallel output lines of control register 650 are respectively labeled DIGREV[0], DIGREV[1], DIGREV[2], . . . , DIGREV[19]. The DIGREV[0] line connects to a first invertor 604 whose output drives the gate of transistor 602. DIGREV[0] also connects to a noninverting input of AND gate 605. The output of AND gate 605 connects to the gate of transistor 603. A second noninverting input of AND gate 605 connects to the DIGREV[1] line. A third, inverting input of AND gate 605 is grounded.

For the case where the DIGREV[0] line is driven to the logic zero level ("0"), it is seen that pass transistor 602 will be turned on to pass the signal present on line E0 to output line $F_0$. The output of AND gate 605 will be driven low ("0") and this will turn off transistor 603.

For the case where the DIGREV[0] and DIGREV[1] lines are both driven to the logic one level ("11"), inverter 604 turns off transistor 602 while AND gate 605 turns on transistor 603 and also a further transistor 611 of next multiplexer switch SW1. The source of transistor 611 is connected to the E0 line. Accordingly the E0 signal passes through transistor 611 to output line $F_1$ while the E1 signal passes through transistor 603 to output line $F_0$.

The output of AND gate 605 is further connected to the inverting input of AND gate 615 in the next control cell. When the output of AND gate 605 goes high (and thereby turns on transistors 603 and 611), the output of AND gate 615 is forced low to prevent the simultaneous turning on of transistor 613. Multiplexer switch SW1 is formed of transistors 611, 612 and 613 with signals E0, E1 and E2 being supplied to the respective sources of these transistors. The drains of transistors 611, 612 and 613 connect at output line $F_1$.

The output of AND gate 615 couples to the inverting input of AND gate 625 in the next control cell. The output of AND gate 625 connects to the inverting input of AND gate 635 in the next control cell, and so on. In the last stage, the DIGREV[19] line connects to the input of inverter 694. The output of inverter 694 connects to the gate of transistor 692. Line E19 connects to the source of transistor 692. Line E18 connects to the source of transistor 691. The source and gate terminals of transistor 693 are grounded. The drains of transistors 691, 692 and 693 join at output line $F_{19}$ to form multiplexer switch SW19.

Those skilled in the art will recognize that many other control schemes may be used for implementing the digit unreverse control unit. The above disclosure is merely illustrative of the spirit of the present invention.

By way of example, N-transistors 601–693 may be each replaced with a CMOS transmission gate. A CMOS transmission gate comprises a P-channel transistor and a N-channel transistor coupled in parallel one to the other. Complementary control signals are applied to the gates of the P and N transistors to turn the transmission gate on or off.

By way of further example, the pass-transistor implemented multiplexer switches $SW_0$–$SW_{19}$ of FIG. 6 can be replaced with AOI (AND/OR/Inverter) implemented multiplexers. An AOI-implemented multiplexer comprises an OR gate at its output and a plurality of AND gates at its input. The outputs of the AND gates connect to respective inputs of the OR gate. Inverted and/or noninverted versions of select signals are applied to the inputs of the plural AND gates for selecting one of the AND gates as the input source. An input signal applied to a further input terminal of the selected AND gate then passes through that gate and through the OR gate to the output of the multiplexer. Pass-transistor or transmission-gate implementations of multiplexers are used in cases where it is desirable to generate high impedance states on the output bus. The AOI implementation of a multiplexer is preferentially used in cases where it is undesirable to have a high-impedance state on the output bus.

Many variations to the structure of the reversed-field sequence generator will also become apparent to those skilled in the art after reading the above disclosure. By way of example, in situations where the number of reversed-field sequences is relatively small, multiplexer schemes may be used for producing the reversed fields. Reversed-field sequence generators may be developed for handling values of N other than integral powers of two.

The above disclosure is to be taken as illustrative of the invention and not as limiting of its scope or spirit. Numerous modifications and variations will become apparent to those skilled in the art after studying the above disclosure. Given the above disclosure of general concepts and specific embodiments, the scope of protection sought is to be defined by the claims appended hereto.

What is claimed is:

1. An address generator for generating a sequence of digit reversed signals to be used in conjunction with a transform of N sample points and one or more radix values, the generator comprising:

a reversed-field sequence generator for generating a series of binary-coded signals respectively representing the natural sequence of integers, i=0, 1, 2, 3, . . . , N−1, where N is a supplied variable, and wherein the bits in the least significant field of size $\log_2 N$ bits of the generated signals are reversed from their natural order; and a digit unreversing unit, operatively coupled to the reversed-field sequence generator for associating subfields of each $\log_2 N$ sized field generated by the reversed-field sequence generator with specific reversed digits and unreversing the bits of each such subfield which has a bit-width greater than one, thereby to produce the corresponding digit in nonreversed form;

wherein said reversed-field sequence generator comprises:

an adder having a first input port, a second input port and an output port for producing a sum signal representing the sum of first and second binary-coded signals applied respectively to the first and second adder input ports, said adder being a forward adder not having an ability to add backwards;

feedback means for feeding the sum signal back to the second input port of the adder;

a first bus twist for supplying a field-reversed signal whose unreversed version represents the variable value N/2 to the first input port of the adder; and a second bus twist for supplying a field-reversed version of the sum signal as an output of the reversed-field sequence generator.

2. An address generator according to claim 1 wherein said reversed-field sequence generator further comprises:

an accumulating register having an input coupled to the output port of the adder and an output coupled to the second input port of the adder and to the second bus twist.

3. An address generator according to claim 1 wherein said digit unreversing unit comprises:

a plurality of switches, $SW_0$ through $SW_n$, where for a value j in the range 0 to n, each switch $SW_j$ of said plurality of switches has an output $F_j$ and at least $2((\log_2 R_M)-1)+1$ inputs respectively coupled to line $E_j$ and neighboring lines $E_{j-k}$ and $E_{j+k}$ thereof, where $R_M$ is the maximum radix value to be used in a corresponding digital signal processor and line $E_j$ is one of lines $E_0$ through $E_n$ emanating from said reversed-field sequence generator, where n is a predetermined maximum field width and where k is a variable equal to or greater than $\log_2 R_M - 1$; and programmable switch control means, responsive to a supplied programming signal, for coupling the output of a given switch $SW_j$ to its corresponding input line $E_j$ when the programming signal indicates that digit unreversal is not required and for coupling the output of the given switch $SW_j$ to another of its corresponding input lines, selected from the group $E_{j-k}$ through $E_{j+k}$ excluding $E_j$, when the programming signal indicates that digit unreversal is required.

4. An address generator according to claim 3 wherein output lines $F_0$ through $F_n$ of said digit unreversing unit couple to corresponding address input lines of a memory unit containing input components x(i) in memory locations corresponding to i=0, 1, 2, ..., N−1.

5. An address generator according to claim 1 wherein said transform is a multistage FFT transform having a corresponding mix of two or more different radix values and wherein said digit unreversing unit includes means for associating subfields of each $\log_2 N$ sized field generated by the reversed-field sequence generator with specific reversed digits in accordance with the mix of radix values used by the transform.

6. An address generator according to claim 1 wherein said transform is a multistage FFT transform having a corresponding mix of sequential radices $r_1, r_2, r_3, \ldots, r_m$ satisfying $r_1 \cdot r_2 \cdot r_3 \cdot \ldots \cdot r_m = N$ and wherein said digit unreversing unit includes means for associating subfields of each $\log_2 N$ sized field generated by the reversed-field sequence generator with said specific reversed digits in accordance with any practical mix of same or different radix values used by the transform to satisfy $r_1 \cdot r_2 \cdot r_3 \cdot \ldots \cdot r_m = N$.

7. A method for generating signals representing a digit reversed sequence that is to be used in conjunction with a transform of N sample points where N is a variable and the transform is a multistage transform using a mix of same or different radix values satisfying $r_1 \cdot r_2 \cdot r_3 \cdot \ldots \cdot r_m = N$, the method comprising the steps of:

receiving a transform-size defining signal defining the value of N;

in response to the transform-size defining signal, generating a series of binary-coded signals representing the natural sequence of integers, i=0, 1, 2, 3, ..., N−1, with the bits in the least significant field of size $\log_2 N$ bits being reversed from their natural order;

receiving an associating signal that associates specific subfields of the field generated by the generating step with corresponding reversed digits based on the mix of radix values used by said multistage transform; and in response to the associating signal, unreversing the bits of each associated subfield of width greater than one-bit to thereby produce the digit in nonreversed form.

8. The generating method of claim 7 wherein said step of generating a series of binary-coded signals comprises the steps of:

(a) providing an ordinary binary adder having an ability to add in a forward direction only, said binary adder having an output and a plurality of inputs;

(b) coupling the output of the binary adder to a first of the adder inputs;

(c) producing from the transform-size defining signal, a reversed-size signal having a field of size $\log_2 N$ bits or greater where the reversed-size signal represents a field-reversed binary-coded version of the value n/2;

(d) supplying the reversed-size signal to a second of the adder inputs; and (e) field-reversing a binary-coded output signal output from the adder output thereby to produce at least one of said binary-coded signals representing the natural sequence of integers, i=0, 1, 2, 3, ..., N−1, with the bits in the least significant field of size $\log_2 N$ bits being reversed from their natural order.

9. The generating method of claim 8 wherein said step of generating a series of binary-coded signals further comprises:

repeating steps (d) and (e) of claim 8 thereby to produce others of said binary-coded signals representing the natural sequence of integers, i=0, 1, 2, 3, ..., N−1, with the bits in the least significant field of size $\log_2 N$ bits being reversed from their natural order.

10. The generating method of claim 7 wherein said mix of radix values satisfying $r_1 \cdot r_2 \cdot r_3 \cdot \ldots \cdot r_m = N$ includes radices of different value.

11. The generating method of claim 10 wherein said step of supplying an associating signal accommodates any sequence of practical radix values satisfying $r_1 \cdot r_2 \cdot r_3 \cdot \ldots \cdot r_m = N$.

12. A reversed-field sequence generator for generating a series of binary-coded signals respectively representing the natural sequence of integers, i=0, 1, 2, 3, ..., N−1, with the bits in the least significant field of size $\log_2 N$ bits being reversed from their natural order, the reversed-field sequence generator comprising:

an adder having a first input port, a second input port and an output port for producing a sum signal representing the sum of first and second binary-coded signals applied respectively to the first and second adder input ports., said adder being a forward adder not having an ability to add backwards;

feedback means for feeding the sum signal back to the second input port of the adder;

a first bus twist for supplying a field-reversed signal whose unreversed version represents the value N/2 to the first input port of the adder; and a second bus twist for supplying a field-reversed version of the sum signal as an output of the reversed-field sequence generator.

13. An address generator according to claim 12 wherein said reversed-field sequence generator further comprises:

an accumulating register coupled between the output port of the adder and the second input port of the adder.

14. An address generator for generating a sequence of digit reversed signals to be used in conjunction with a multistage transform of N sample points, said transform being characterized by a mix of same or different radix values satisfying $r_1 \cdot r_2 \cdot r_3 \cdot \ldots \cdot r_m = N$, where N is a variable, the generator comprising:

a programmable reversed-field sequence generator, responsive to a supplied size signal indicating the value of the variable N, for generating a series of binary-coded signals respectively representing the natural sequence of integers, i=0, 1, 2, 3, . . . , N−1, with the bits in the least significant field of size $\log_2 N$ bits reversed from their natural order; and a digit unreversing unit, operatively coupled to the reversed-field sequence generator and responsive to a supplied associating signal that associates specific subfields of the least significant field generated by the reversed-field sequence generator with corresponding reversed digits based on the mix of radix values used by said multistage transform, said digit unreversing unit being for unreversing the bits of each such subfield which has a bit-width greater than one, thereby to produce the corresponding digit in nonreversed form.

15. An address generator according to claim 14, wherein said mix of radices includes different radix values.

16. An address generator according to claim 15, wherein said mix of different radices is a sequential mix, $r_1, r_2, r_3, \ldots, r_m$ corresponding to sequential stages of the multistage transform and wherein said digit unreversing unit includes means for associating subfields of each $\log_2 N$ sized field generated by the reversed-field sequence generator with said specific reversed digits in accordance with any practical mix of the different radix values used by the transform to satisfy $r_1 \cdot r_2 \cdot r_3 \cdot \ldots \cdot r_m = N$.

17. An address generator according to claim 14 wherein said programmable reversed-field sequence generator is responsive to the supplied size signal for at least three different values of the variable N.

18. An address generator according to claim 17 wherein said programmable reversed-field sequence generator is responsive to the supplied size signal for three or more values of N that are integer powers of 2 in the range $N=2^5$ to $N=2^{20}$.

19. An address generator according to claim 14 wherein said programmable reversed-field sequence generator and said digit unreversing unit are defined on an integrated circuit.

20. An address generator for generating a sequence of digit reversed signals to be used in conjunction with an FFT transform of N sample points and a mix of sequential radices $r_1 \cdot r_2 \cdot r_3 \cdot \ldots \cdot r_m = N$, where radices $r_1$ through $r_m$ can be all the same or any of radices $r_1$ through $r_m$ can be different from another of said radices, the generator comprising:

a reversed-field sequence generator for generating a series of binary-coded signals respectively representing the natural sequence of integers, i=0, 1, 2, 3, . . . , N−1, with the bits in the least significant field of size $\log_2 N$ bits reversed from their natural order; and a digit unreversing unit, operatively coupled to the reversed-field sequence generator for associating subfields of the field generated by the reversed-field sequence generator with a specific reversed digit and unreversing the bits of each such subfield which has a bit-width greater than one, thereby to produce the corresponding digit in nonreversed form;

where the digit unreversing unit includes a programable radix-defining means which is programmably configurable to define the individual values of each radix in said mix of sequential radices to correspond with a desired one of plural radix mixes satisfying $r_1 \cdot r_2 \cdot r_3 \cdot \ldots \cdot r_m = N$; the programable radix-defining means performing said function of associating subfields of the field generated by the reversed-field sequence generator with specific reversed digits.

21. An address generator for generating a sequence of digit reversed signals to be used in conjunction with an FFT transform of N sample points and a mix of sequential radices $r_1 \cdot r_2 \cdot r_3 \cdot \ldots \cdot r_m = N$, where N is variable and any of radices $r_1$ through $r_m$ can be different from another of said radices, the generator comprising:

a programmable reversed-field sequence generator, responsive to a stored size signal that indicates the value of N, for generating a series of binary-coded signals respectively representing the natural sequence of integers, i=0, 1, 2, 3, . . . , N−1, with the bits in the least significant field of size $\log_2 N$ bits reversed from their natural order; and a digit unreversing unit, operatively coupled to the reversed-field sequence generator for associating each subfield of the field generated by the reversed-field sequence generator with a specific reversed digit and unreversing the bits of each such subfield which has a bit-width greater than one, thereby to produce the corresponding digit in nonreversed form;

where the digit unreversing unit includes a programmable radix-defining means which is programmably configurable to define the individual values of each radix in said mix of sequential radices to any practical mix satisfying $r_1 \cdot r_2 \cdot r_3 \cdot \ldots \cdot r_m = N$; the programmable radix-defining means performing said function of associating subfields of the field generated by the reversed-field sequence generator with specific reversed digits.

22. A method for generating a sequence of digit reversed signals to be used in conjunction with an FFT transform of N sample points and a mix of sequential radices $r_1 \cdot r_2 \cdot r_3 \cdot \ldots \cdot r_m = N$, where N is variable and any of radices $r_1$ through $r_m$ can be different from another of said radices, the method comprising the steps of:

programming a programmable reversed-field sequence generator that is responsive to a supplied size signal indicating the value of N to generate a series of binary-coded signals respectively representing the natural sequence of integers, i=0, 1, 2, 3, ..., N−1, with the bits in the least significant field of size $\log_2 N$ bits reversed from their natural order;

producing a radix-defining signal for associating each subfield of the field generated by the reversed-field sequence generator with a specific reversed digit that is associated with an individual radix in said mix of sequential radices $r_1 \cdot r_2 \cdot r_3 \cdot \ldots \cdot r_m = N$; said producing step also defining the value of each radix in said mix of sequential radices $r_1 \cdot r_2 \cdot r_3 \cdot \ldots \cdot r_m$; and in response to the radix-defining signal, unreversing the bits of each such subfield which has a bit-width greater than one, thereby to produce the corresponding digit in nonreversed form.

23. An address generator for generating a sequence of digit reversed signals to be used in conjunction with a multistage transform of N sample points, said transform being characterized by a sequential mix of radix values satisfying $r_1 \cdot r_2 \cdot r_3 \cdot \ldots \cdot r_m = N$, where N is a variable, the generator comprising:

reversed-field sequence generating means, responsive to a supplied size signal indicating the value of the variable N, for generating a series of binary-coded signals respectively representing the natural sequence of integers, i=0, 1, 2, 3, ..., N−1, with the bits in the least significant field of size $\log_2 N$ bits that represent said natural sequence of integers being reversed from their natural order; and digit unreversing means, operatively coupled to the reversed-field sequence generating means and responsive to a supplied associating signal that associates specific subfields of the least significant field generated by the reversed-field sequence generator with corresponding reversed digits based on the sequential mix of radix values used by said multistage transform, said digit unreversing means being for unreversing the bits of each such subfield which has a bit-width greater than one, thereby to produce the corresponding digit in nonreversed form.

24. An address generator according to claim 23 wherein said digit unreversing means comprises:

a plurality of switches, $SW_0$ through $SW_n$, where for a value j in the range 0 to n, each switch $SW_j$ of said plurality of switches has an output $F_j$ and at least $2((\log_2 R_M)-1)+1$ inputs respectively coupled to line $E_j$ and neighboring lines $E_{j-k}$ and $E_{j+k}$ thereof, where $R_M$ is the maximum radix value to be used in a corresponding digital signal processor and line $E_j$ is one of lines $E_0$ through $E_n$ emanating from said reversed-field sequence generating means, where n is a predetermined maximum field width and where k is a variable equal to or greater than $\log_2 R_M - 1$; and programmable switch control means, responsive to said associating signal, for coupling the output of a given switch $SW_j$ to its corresponding input line $E_j$ when the associating signal indicates that digit unreversal is not required and for coupling the output of the given switch $SW_j$ to another of its corresponding input lines, selected from the group $E_{j-k}$ through $E_{j+k}$ excluding $E_j$, when the associating signal indicates that digit unreversal is required.

25. An address generator according to claim 23 wherein said reversed-field sequence generating means and said digit unreversing means are defined on an integrated circuit.

* * * * *

UNITED STATES PATENT AND TRADEMARK OFFICE
CERTIFICATE OF CORRECTION

PATENT NO. : 5,473,556
DATED : December 5, 1995
INVENTOR(S) : Raul A. Aguilar et al.

It is certified that error appears in the above-indentified patent and that said Letters Patent is hereby corrected as shown below:

Column 1, line 35, "N-1:X(k)" should be --N-1:$\underline{X}$(k)--.
　　　　　　line 41, "X(0) through X(N-1)" should be --($\underline{X}$(0) through $\underline{X}$(N-1)--.
　　　　　　line 43, "X(k)" should be --$\underline{X}$(k)--.
Column 4, line 63, "X(k)" should be --$\underline{X}$(k)--.
Column 7, line 10, "X(i)" should be --$\underline{X}$(i)--.
　　　　　　line 38, "X(i)" should be --$\underline{X}$(i)--.
　　　　　　line 55, "X(i)" should be --$\underline{X}$(i)--.
Column 8, line 12, "X(i)" should be --$\underline{X}$(i)--.
Column 10, line 19, "$E_{j-i}$" should be --$E_{j-1}$--
　　　　　　line 22, "$E_{j\neq}$" should be --$E_{j+3}$--.
Column 11, line 11, "SWJ" should be --SWj--.
Column 15, line 7, "ports.," should be --ports,--.

Signed and Sealed this

Fourteenth Day of May, 1996

Attest:

BRUCE LEHMAN

*Attesting Officer*　　　*Commissioner of Patents and Trademarks*